UNITED STATES PATENT OFFICE.

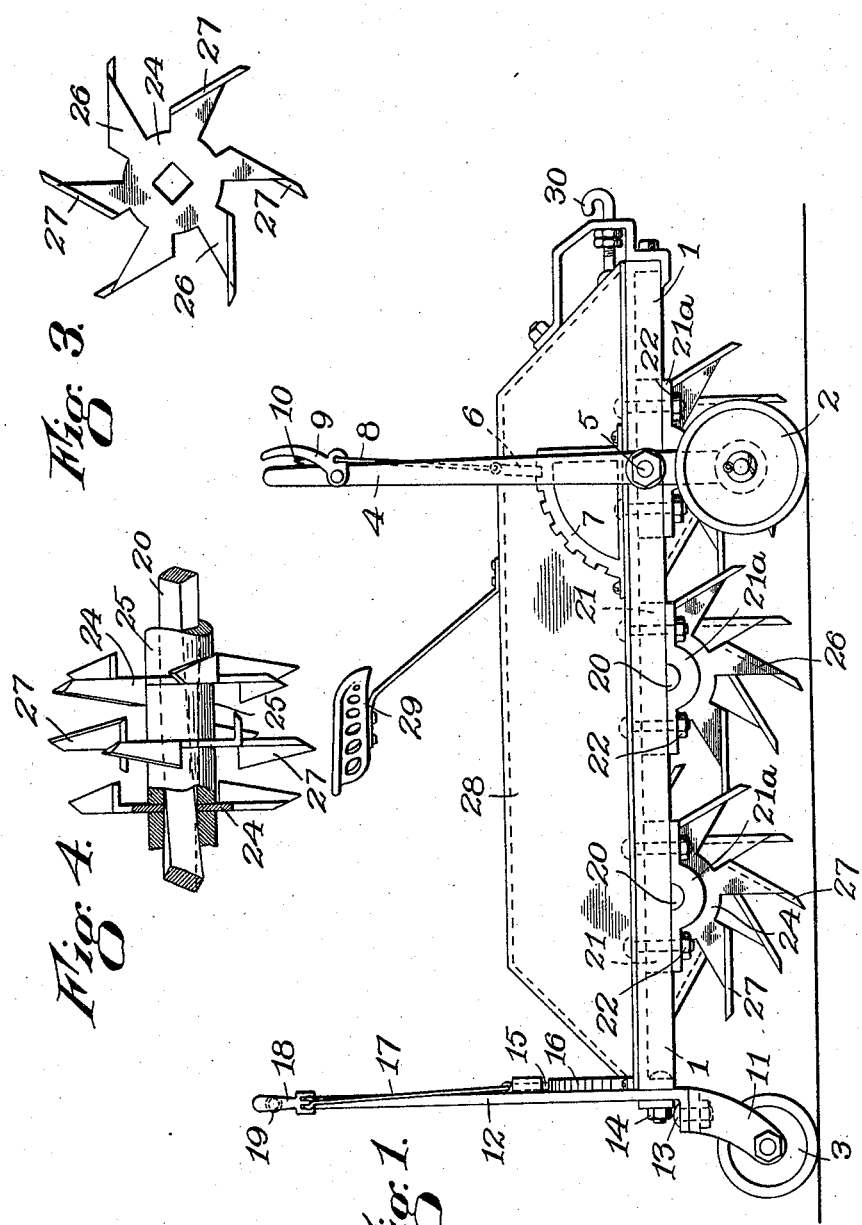

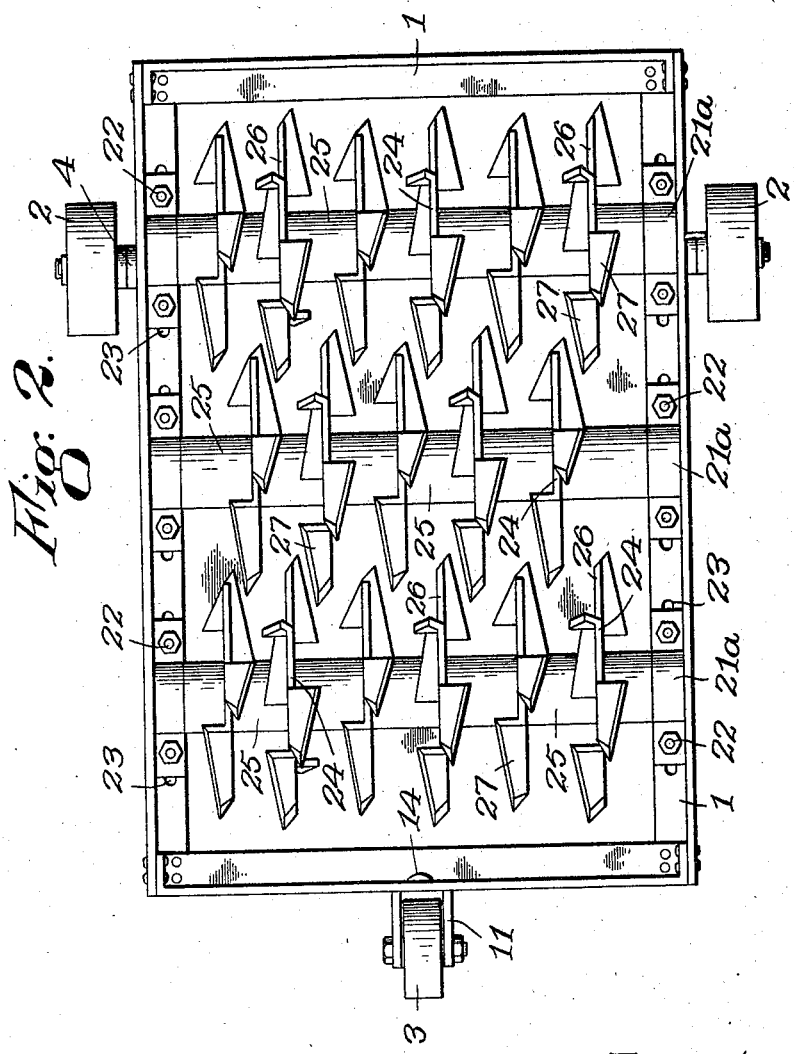

JOHAN ISAK HALDIN, OF GARDNER, MASSACHUSETTS.

HARROW.

1,178,515.　　　Specification of Letters Patent.　　Patented Apr. 11, 1916.

Application filed January 3, 1914. Serial No. 810,266.

*To all whom it may concern:*

Be it known that I, JOHAN ISAK HALDIN, a subject of the Czar of Russia, residing at Gardner, in the county of Worcester and Commonwealth of Massachusetts, have invented a new and useful Improvement in Harrows, of which the following, together with the accompanying drawings, is a specification.

My invention relates to harrows and more particularly to that class of harrows which include rotatable members for loosening or pulverizing the soil and for smoothing the surface of uneven ground.

One object of the invention is to provide an improved form of rotating member for a harrow, the member being especially adapted for penetrating deeply into the soil and for loosening and pulverizing the soil thoroughly.

Another object of the invention is to provide a number of rotatable members for a harrow, the members being so constructed and arranged as to coöperate in breaking or cutting up lumps of soil which have already been formed.

Another object of the invention is to construct the supporting mechanism for the rotatable members in such manner that the relative positions of the members may be adjusted to give the most desirable results.

Other objects and advantages will appear from the following description taken in connection with the accompanying drawings, in which—

Figure 1 is a side elevation of a harrow constructed in accordance with my invention; Fig. 2 is a bottom view of the harrow; Fig. 3 is a side view of one of the rotatable members of the harrow; and Fig. 4 is a front view of a portion of one of the shafts with the rotatable elements supported thereby, the view being partially in section to show details of construction.

Like reference characters refer to similar parts in the different figures.

In the form of the invention shown in the drawings, the harrow includes a frame 1 having attached thereto a pair of wheels 2 at opposite sides of its forward portion and a single wheel 3 at the center of its rear end. Each of the forward wheels 2 is pivoted to the lower end of a lever 4 which is in turn carried by a pivot 5 extending from a side of the frame 1 near its forward end. The levers 4 are maintained in various angular positions about the pivots 5 by means of pawls 6 which are adapted to engage the teeth of arcuate racks 7 secured in suitable positions to the frame 1. The pawls 6 may be disengaged from the racks 7 by means of rods 8 and the lever handles 9, the springs 10 tending to hold the pawls normally in engagement with the racks. The wheel 3 is pivoted between the free extremities of the two arms of a U-shaped member 11 which is attached to the out-turned lower end of the lever 12 by a pivot 13. The lever 12 is attached to the center of the rear end of the frame 1 by a pivot 14 and is maintained in various angular positions about this pivot by a pawl 15 adapted to engage the teeth of a rack 16. The pawl 15 may be disengaged from the rack 16 by a rod 17 and a lever handle 18, a spring 19 tending to hold the pawl 15 normally in engagement with the rack 16.

A number of transverse shafts 20 are carried by the frame 1 in bearings, part of each bearing being formed in the lower face of a block 21 and the remainder being formed in the upper face of a member 21$^a$ secured to the frame by bolts 22 passing through slots 23 formed in the sides of the frame. Each shaft 20 carries a plurality of disks, the shafts passing through openings in the centers of the disks. The openings in the disks are polygonal, preferably square, and the size and shape of the cross section of each shaft conform to the size and shape of these openings so as to prevent relative rotation between the disks and shafts. A sleeve 25 surrounds the shaft between each two adjacent disks and between each end disk in the adjacent side of the frame, in order to space the disks properly upon the shafts and to support them firmly at right angles to the axes of the shafts.

Each disk 24 is formed with a plurality of substantially radially arranged teeth 26 and, in order that the harrow may pass smoothly along the ground, it is desirable that some of the disks upon each shaft be arranged with their teeth disposed at different angles from those of other disks upon the said shaft, that is, with the teeth of some of the disks opposite the spaces between the teeth of other disks on the same shaft. This result is accomplished by twisting the shaft as indicated in Fig. 4.

The purpose of the wheels 2 and 3, while in the positions shown in Figs. 1 and 2, is to raise the disks 24 out of contact with the ground so that the harrow may be easily drawn from place to place without injuring the disks or the surface over which the harrow is passing. When it is desired to use the harrow for loosening and stirring up the soil, the levers 4 and 12 which carry the wheels 2 and 3 may be depressed about their supporting pivots 5 and 14, thus raising the wheels 2 and 3 sufficiently with relation to the body of the harrow to clear the surface of the ground while the harrow is being used.

Each of the disks 24 comprises a central body portion from which the teeth 26 radiate. Each tooth 26 converges outwardly and its trailing edge, as it rotates while passing along the ground, is bent substantially at right angles to the plane of the disk or into a plane parallel with the axis of its shaft.

The outwardly turned edges or wings 27 are bent alternately toward opposite sides of the disk, and each of these wings converges toward its outer extremity which projects somewhat beyond the outer extremity of the tooth 26 carrying it. The free edges of each wing 27 which meet at its outer extremity are sharpened to form cutting edges as indicated in Fig. 2, the bevel of each of these cutting edges being upon the trailing face of the wing as the disks rotate while in use.

There are various advantages of the peculiarly shaped and located wings 27 of the disks 24, their sharply pointed extremities together with the sharpened edges converging at these extremities permitting the weight of the harrow to force these wings deeply into the ground so as to pulverize or loosen up a thick upper layer of the soil. The effect of the wings 27 in breaking up the soil is increased by the fact that they are located substantially in planes offset from the axes of their shafts. After each wing 27 has been driven into the soil by the weight of the harrow, its upper portion is forced forwardly by the motion of the harrow, thus partially loosening the soil, and immediately thereafter it is lifted out of the soil about a fulcrum formed by the succeeding wing 27 as it in turn is being driven into the soil, the direction in which each wing leaves the soil being at a considerable angle to the plane in which it lies. The action of the wings 27 upon the soil is, therefore, somewhat similar to that of an ordinary shovel or spade as it is commonly used, the tendency being to lift portions of the soil rather than to force them to one side.

The shafts 20 which carry the disks 24 are adjustable longitudinally of the harrow by changing the positions of the bearing members 21 and 21ᵃ, the slots 23 being elongated to permit the bolts 22 to change their positions for this purpose. The disks 24 upon adjacent shafts overlap and alternate as shown in Fig. 2, and the positions of the wings 27 are such that a cutting edge of each wing passes close to a cutting edge of one or more wings carried by adjacent shafts during the rotation of the disks. In case the soil being harrowed is not soft and light, the wings 27 are liable to lift lumps of soil upon their upper faces as they rise from the ground. As the wings carried by all the shafts except the rear one rise, however, they pass close to descending wings supported by adjacent shafts, so that any overhanging portions of lumps of soil supported upon the rising wings are cut or scraped away and the lumps more or less thoroughly broken up. In a harrow comprising three or more sets of disks, this action is repeated several times so that the final result is that the soil is not only loosened to a considerable depth, but it is thoroughly disintegrated and pulverized and the various layers thoroughly mixed together. The adjustment of the shafts with their disks longitudinally of the harrow permits the opposed sharpened edges of the wings 27 to be adjusted to and from each other as they become worn, or as the character of the soil being harrowed varies, the opposed edges of the wings being at an angle to the plane of their respective disks to permit this result.

A cover or casing 28 serves to prevent injury to persons using the harrow and to support a seat 29. At the forward end of the harrow a draft hook is provided by means of which the harrow may be drawn along the ground.

While I have shown and described the details of one form of my invention, I do not wish to be limited to such details as changes may be made without departing from the spirit of the invention; but Having described my invention, what I claim as new and desire to secure by Letters Patent is:

1. A harrow including a rotatable disk having a flat tooth extending therefrom in a plane perpendicular to its axis of rotation, the edges of the tooth converging toward its free end, and a wing extending from one of said edges and in a plane parallel to said axis, the edges of the wing converging toward its outer end and extending beyond the outer end of said tooth.

2. A harrow including a rotatable disk having a series of flat teeth extending therefrom in a plane perpendicular to its axis of rotation, and a wing extending from one edge of each tooth, the wings extending alternately in opposite directions, the edges of each wing converging toward its outer end and extending beyond the outer end of the tooth which carries it.

3. A harrow including a pair of teeth rotatably supported about spaced parallel axes, and flat wings carried by said teeth in planes parallel to their axes of rotation, said wings being extended to rotate in overlapping paths and extending toward each other from the adjacent faces of said teeth, the adjacent edges of the wings extending at acute angles to their axes and being contiguous to cut lumps of soil as they pass, and said axes being adjustable toward and from each other to vary the space between the overlapping portions of the paths of said wings.

JOHAN ISAK HALDIN.

Witnesses:
 PENELOPE COMBERBACH,
 NELLIE WHALEN.